Patented Feb. 4, 1930

1,745,907

UNITED STATES PATENT OFFICE

TOSHIO OHORI AND KIYOSHI NAKAZAWA, OF TOKYO, JAPAN, ASSIGNORS TO ZAIDAN HOJIN RIKAGAKU KENKYUJO, OF TOKYO, JAPAN

PROCESS FOR PRODUCING A LIQUID INSECTICIDE CONTAINING EFFECTIVE INGREDIENT OF DERRIS SPECIES

No Drawing. Application filed February 10, 1928, Serial No. 253,526, and in Japan February 18, 1927.

This invention relates to a process for producing a liquid insecticide containing the effective ingredient of the derris species, which comprises forming a primary material in which the effective ingredient is mixed with material such as oils, fats, waxes, resins, higher alcohols, higher hydrocarbons, higher fatty acids, etc. which are entirely free from water and alkali together with an anhydrous solvent such as benzol, carbon tetrachloride, or trichlor ethan, and mixing the primary material with a soap solution to form a colloidal solution. The object of the invention is to facilitate the emulsionizing of the product when the primary material is mixed with a soap solution in use, as well as to preserve the activity of the effective ingredient.

In the specification of the previous patent application U. S. Serial No. 53,743, there is described a process for producing a liquid insecticide containing the effective ingredient of derris species, which comprises forming a primary material in which the effective ingredient is mixed with an anhydrous and alkali free material such as oils, fats, waxes, resins, higher alcohols, higher hydrocarbons, higher fatty acids, etc., which are entirely free from water and alkali, and the primary material then mixed with a soap solution to form a colloidal solution. The present invention is an improvement of the above process and is characterized in that, to the primary material, an anhydrous solvent such as benzol, carbon tetrachloride or trichlor ethan is added. By this addition of the anhydrous solvent, the formation of the final product, that is, the colloidal solution is remarkably facilitated so that, when the primary material containing the anhydrous solvent is mixed with a soap solution, a good emulsion is almost instantly formed without necessitating any hot water or other heat energy.

Example I

To 100 grams of powdered derris root, 10 litres of ether are added to extract the effective ingredient of the derris root after extraction is complete, the whole or greater part of the ether is evaporated and recovered. To the residual effective ingredient a mixture of 150 grams of anhydrous and alkali free fish oil and 150 grams of benzol (as the anhydrous solvent) are added, so that a solution of the effective ingredient in benzol results. This is the improved primary material.

The soap solution is easily prepared by, for instance, adding 500 grams of soap to 100 kilograms of water. The solution is mixed to the improved primary material in use.

Example II

To 1 kilogram of powdered derris root, 5 kilograms of benzol are added and the effective ingredient of the derris root is extracted while warming the benzol. The benzol is recovered by evaporation. To the residual effective ingredient, a mixture of 600 grams of anhydrous and alkali free fish oil and 600 grams of carbon tetrachloride (as the anhydrous solvent) are added to form a solution of the effective ingredient. This is the improved primary material.

The soap solution may be the same as exemplified in Example I.

Trichlor ethan as the anhydrous solvent can be used as well.

Also in the two examples given, the improved primary material can be easily prepared in the form of powder when 800 grams of anhydrous gum arabic are added.

Claim:

A process for producing a liquid insecticide containing the effective ingredient of derris species, which comprises forming a primary material in which the effective ingredient is mixed with an anhydrous and alkali free material of an oily nature and dissolved in an anhydrous solvent such as benzol, carbon tetrachloride or trichlor ethan, and then mixing the primary material with a soap solution to form a colloidal solution.

In testimony whereof we affix our signatures.

TOSHIO OHORI.
KIYOSHI NAKAZAWA.